May 7, 1957 L. O. ALLEN ET AL 2,791,081
TRACTOR ATTACHED MOWER
Filed Feb. 8, 1956 2 Sheets-Sheet 1
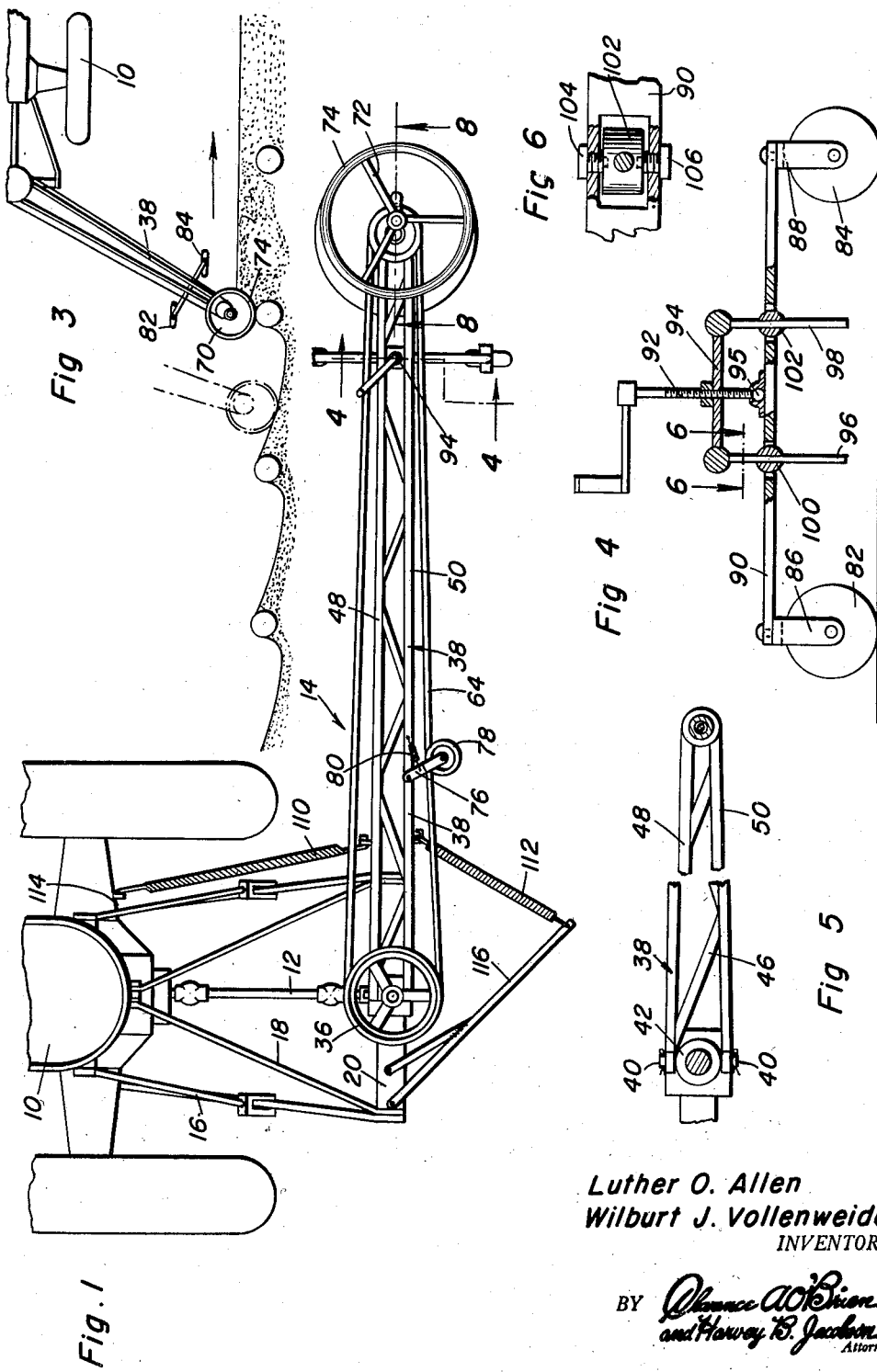
Luther O. Allen
Wilburt J. Vollenweider
INVENTORS

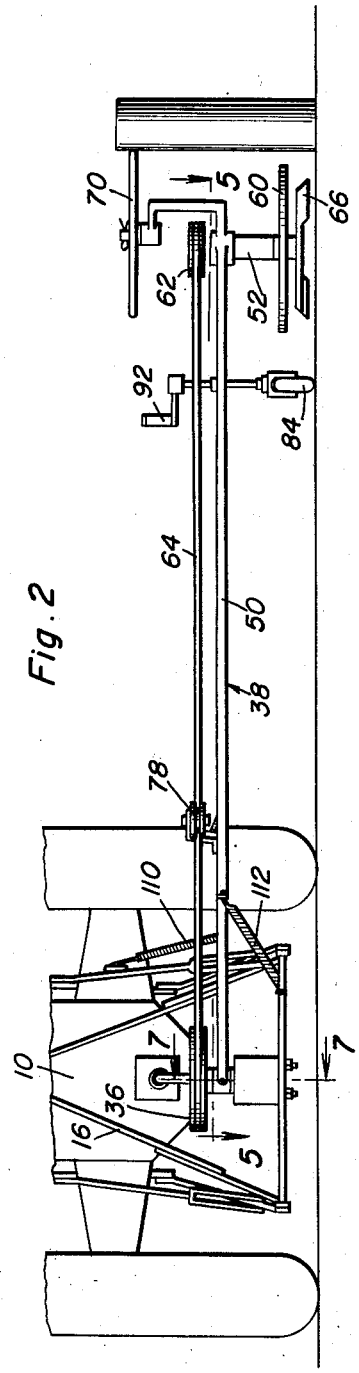
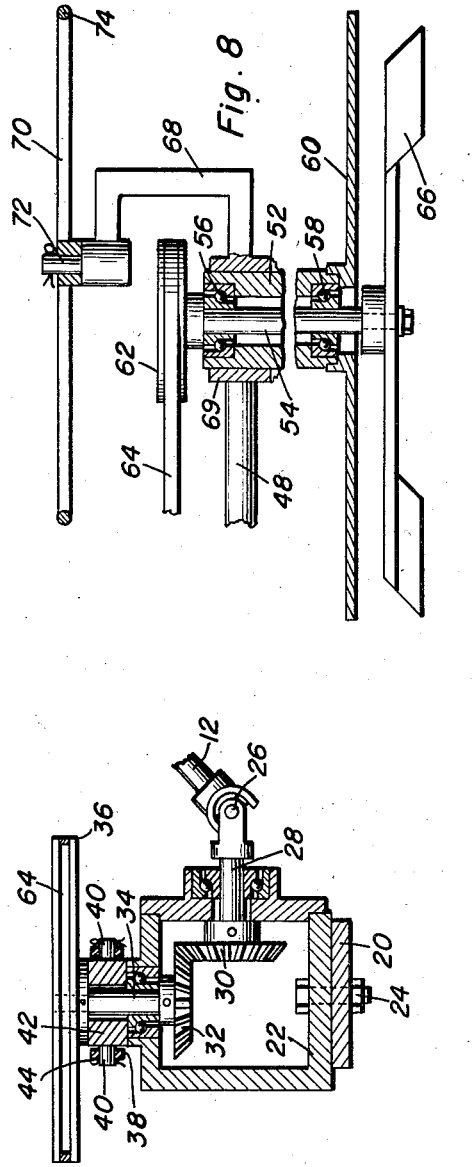

United States Patent Office 2,791,081
Patented May 7, 1957

2,791,081

TRACTOR ATTACHED MOWER

Luther O. Allen and Wilburt J. Vollenweider,
La Crescent, Minn.

Application February 8, 1956, Serial No. 564,279

2 Claims. (Cl. 56—25.4)

This invention relates to the class of agricultural equipment and more particularly to a rotary mower adapted to be attached to and pulled by a tractor.

The primary object of the present invention resides in the provision of a mower adapted to function close to fence posts, trees, and the like and to cut grass and weeds in the area between the fence posts in a convenient and highly effective manner to thereby substantially reduce the length of time necessary to mow lawns and the like while also eliminating the necessity for the use of hand tools to cut the grass or weeds between the fence posts after power mowing operation.

The construction of this invention features the utilization of a frame which is horizontally and pivotally mounted on a framework suitably deatchably secured to a tractor in any convenient manner. The arm is spring urged to a position normal to the longitudinal axis of the tractor but can pivot on engagement with a fence post so that the arm and cutter blade can ride around the fence post or the like, cutting at least a portion of the weeds and grass growing between adjacent fence posts, trees, etc.

Still further objects and features of this invention reside in the provision of a tractor attached mower that is simple in construction, efficient in use, having means for easily adjusting the height of the rotary blade above the ground, and which employs novel ground engaging wheels so mounted that they will continue to track in a direction parallel to the path of motion of the tractor thereby assuring proper support for the blade when the mower is traversing even comparatively uneven terrain.

These, together with the various ancillary objects and features of the invention which will become apparent as the following description proceeds, are attained by this tractor attached mower, a preferred embodiment of which has been illustrated in the accompanying drawings, by way of example only, wherein:

Figure 1 is a top plan view of the invention shown attached to the rear of a tractor;

Figure 2 is a rear elevational view of the tractor attached mower;

Figure 3 is a partial schematic illustration of the manner of operation of the invention;

Figure 4 is an enlarged vertical sectional detail view as taken along the planes of line 4—4 in Figure 1;

Figure 5 is an enlarged fragmentary sectional detail view as taken along the plane of line 5—5 in Figure 2 illustrating the pivotal mounting arrangement for the frame;

Figure 6 is a sectional detail view in an enlarged scale as taken along the plane of line 6—6 in Figure 4;

Figure 7 is a sectional detail view as taken along the plane of line 7—7 in Figure 2 showing in an enlarged scale the bevel gear arrangement used as a portion of the drive means for the mower; and Figure 8 is a sectional detail view taken along the plane of line 8—8 in Figure 1 illustrating in an enlarged scale the arrangement of the blade and guard therefor.

With continuing reference to the accompanying drawings wherein like reference numerals designate similar parts throughout the various views, reference numeral 10 generally designates a tractor of conventional construction which has a power take-off shaft 12 connected thereto which serves to drive the tractor attached mower generally designated by reference numeral 14 and comprises the present invention.

The mower 14 includes a suitable framework 16 of any convenient shape and size braced as at 18 and provided with a mounting plate 20 to which a gear housing 22 is suitably secured as by means of the bolt assembly 24 shown in Figure 7. The power take-off shaft 12 is connected by a suitable coupling preferably a universal joint as is shown at 26 to a stub shaft 28 on which a first bevel gear 30 is secured. Intermeshing with the bevel gear 30 is another bevel gear 32 secured to a stub shaft 34 on which a first pulley 36 is secured.

Mounted for horizontal pivotal movement about the vertical axis provided by the stub shaft 34 is a frame 38 whose members are also pivoted for vertical pivotal movement about the pins 40 passing through the collar 42 forming trunnions, the pins 40 being secured to the collar 42 about the shaft 34. Suitable cotter keys 44 or the like may be utilized for holding the portions of the frame 38 on the pins 40 as desired. The frame 38 is of any suitable shape but may be suitably braced by brace members 46 extending diagonally between the outwardly converging side members 48 and 50 of the frame.

At the outer end of the frame there is provided a bearing box 52 in which a driven shaft 54 is journaled by means of roller bearing assemblies as at 56 and 58 or the like. Carried by the bearing assembly 52 and fixedly secured thereto is a deflect plate 60 for preventing cut grass or the like from passing upwardly into the shaft 54 and the pulley 62 mounted thereon while also preventing the cut grass from becoming entangled between the belt 64 and entrained about the pulley 62. The belt 64 is also entrained about the pulley 36.

The blade 66 is, of course, fixedly secured to the shaft 54 and rotated upon rotation of the driven shaft 54. Supported by means of bracket 68 is a guard 70 rotatably secured on a pin 72, the guard 70 being in the form of a spoke wheel having a rim as at 74 adapted to engage or contact fence posts, trees and the like during the operation of the mower. The bracket 68 includes a ring 69 which is secured to side member 48 of the frame 38.

Pivotally mounted on the frame 38 by means of a bracket 76 is an idler pulley 78 which is spring urged as at 80 into engagement with the belt 64 so as to provide proper tension for the belt 64.

In order to raise and lower the blade 66 so as to determine the height at which the blade 66 will cut the grass or weeds, there is provided the ground engaging wheels 82 and 84 pivotally mounted by means of casters 86 and 88 on a bar 90. A threaded crank 92 is threadedly secured in a plate 94 carried by the frame 38. This bar is rotatably secured by means of a ball and socket joint 95 to the crank 92.

Pivotally mounted and depending from the plate 94 are a pair of rods 96 and 98 which are vertically slidable in cylindrical mounting members 100 and 102 pivotally mounted by means of pin-type threaded mounted members 104 and 106 forming trunnions for the cylindrical mounting members 100 and 102, as can be seen best in Figures 4 and 6.

A pair of springs 110 and 112 are terminally secured to the frame 38 and to suitable brackets as at 114 and 116 that are fixed to the framework 16 and suitably attached to any suitable points of the tractor. The springs 110 and 112 serve to oppose each other whereby the frame 38 is spring urged to a position extending normal to the longitudinal axis of the tractor 10.

During operation of this invention as the tractor is progressing in the direction indicated by the arrow in Figure 3, the guard 70 will contact a fence post. This will cause the frame 38 to pivot rearwardly along the horizontal axis so that further movement of the tractor will enable the mowing blade to swing around the fence post or tree. Spring action of the springs 110 and 112 will then cause the frame 38 to assume its normal position causing the cutting action along the line as is generally apparent from an inspection of Figure 3.

The wheels 82 and 84 will continue to track in a direction parallel to the path of travel of the tractor thus affording support for the frame independent of the contours of the terrain and maintaining the cutter blade at the desired height.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mower for use in combination with a tractor having a power take-off comprising a mounting framework, a frame pivotally secured to said framework, a blade rotatably mounted at one end of said frame, a spoke wheel rotatably mounted on said frame positioned above said blade and with a portion outwardly thereof, means operatively connected to a power take-off for driving said blades connecting said blade to said power take-off, and springs terminally secured to said frame and said framework for resiliently holding said frame normal to a tractor, said frame being vertically and horizontally pivotally mounted with respect to said framework.

2. A mower for use in combination with a tractor having a power take-off comprising a mounting framework, a frame pivotally secured to said framework, a blade rotatably mounted at one end of said frame, a spoke wheel rotatably mounted on said frame positioned above said blade and with a portion outwardly thereof, means operatively connected to a power take-off for driving said blade connecting said blade to said power take-off, springs terminally secured to said frame and said framework for resiliently holding said frame normal to said tractor, said drive means including a first shaft, a first bevel gear driven by said power take-off, a second bevel gear, said first bevel gear engaging said second bevel gear on said first shaft, a first pulley on said first shaft, a second shaft having a second pulley mounted thereon, an endless belt entrained about said first and second pulleys, said blade being secured on said second shaft, said frame being vertically and horizontally pivotally mounted with respect to said framework, means operatively associated with said frame for adjusting the height of said blade above ground, said means including a guide bar, means pivotally secured to said bar and carried by said frame operatively associated with said bar to adjustably raise and lower said bar, and wheels pivotally secured to said bar.

References Cited in the file of this patent

UNITED STATES PATENTS

| | | |
|---|---|---|
| 1,830,871 | Domagala | Nov. 10, 1931 |
| 2,311,095 | Simpson et al. | Feb. 16, 1943 |
| 2,697,319 | Porter | Dec. 21, 1954 |